May 25, 1943.  T. P. SIMPSON ET AL  2,320,318
METHOD FOR CATALYTIC CONVERSION
Filed July 22, 1942   2 Sheets-Sheet 2
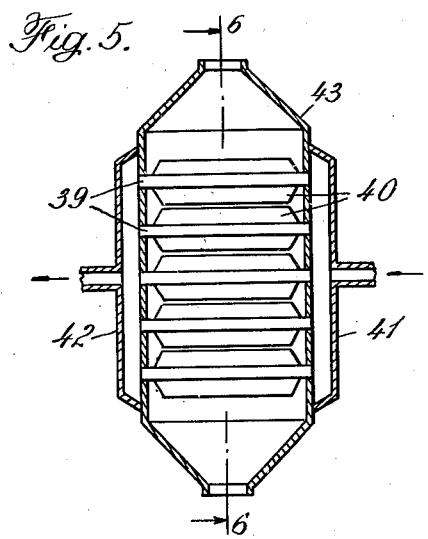
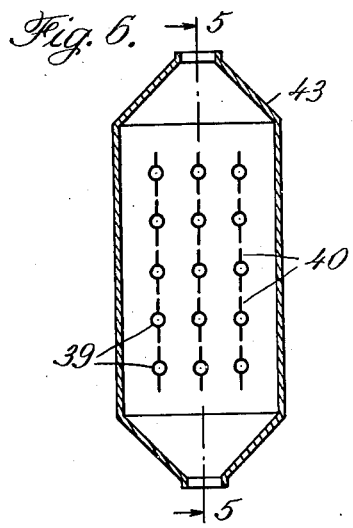
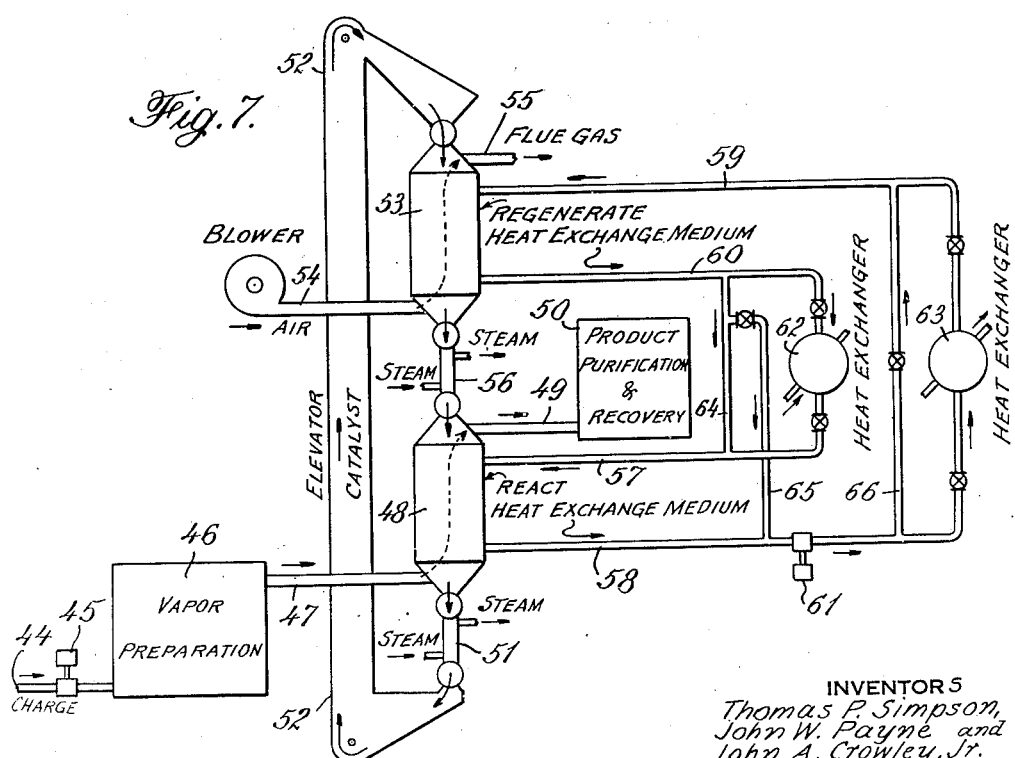
INVENTORS
Thomas P. Simpson,
John W. Payne and
John A. Crowley, Jr.
ATTORNEY Patented May 25, 1943

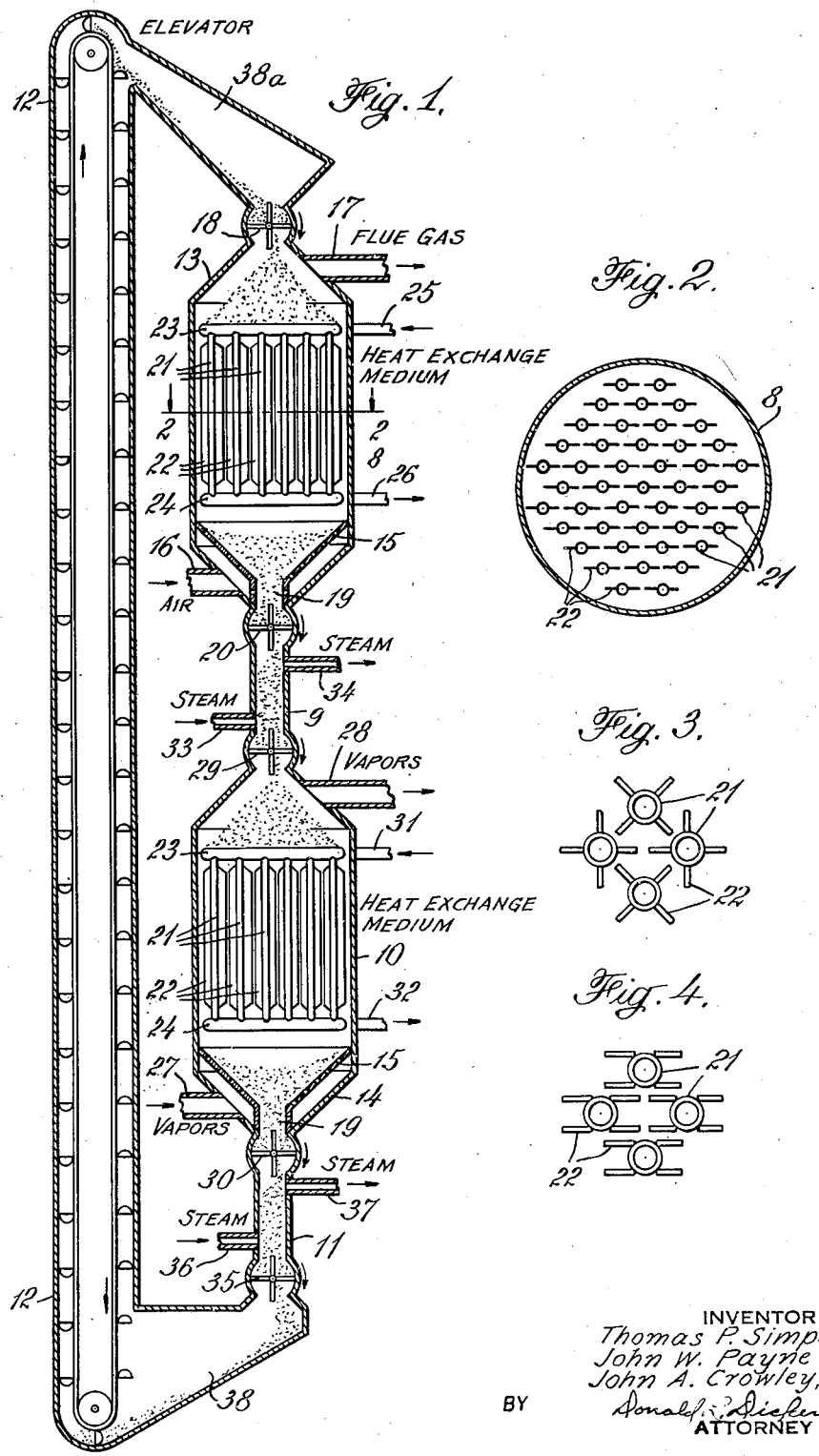

2,320,318

UNITED STATES PATENT OFFICE 2,320,318

METHOD FOR CATALYTIC CONVERSION

Thomas P. Simpson, John W. Payne, and John A. Crowley, Jr., Woodbury, N. J., assignors to Socony-Vacuum Oil Company, Incorporated, a corporation of New York Application July 22, 1942, Serial No. 451,858

16 Claims. (Cl. 196—52)

This invention has to do with chemical reactions which are conducted in the presence of a contact mass, such as, for example, the catalytic conversion of hydrocarbons.

It is known that many operations for the conversion of hydrocarbon materials to other hydrocarbon materials of differing physical and/or chemical properties may be carried out catalytically. Most of these are carried out by contacting the hydrocarbon, usually in vapor form and at high temperature, with a contact mass composed of particles which themselves have a catalytic effect or which are impregnated with or act as a support for other catalytic material of a nature appropriate to the result desired. Such operations may contemplate, for example, the conversion of hydrocarbons of high boiling point to those of lower boiling point, or the polymerization of light or gaseous hydrocarbons to hydrocarbons of higher boiling point. Other operations of like nature are catalytic dehydrogenation, hydrogenation, desulfurizing, partial oxidation, and similar conversions of hydrocarbon materials. The method of operation and apparatus herein described are applicable to all such conversions. Of these operations, the vapor phase cracking of heavy hydrocarbons to gasoline is typical, and this specification will hereinafter discuss such operation as exemplary, without, however, intending to be limited thereby or thereto except by such limits as may appear in the claims.

Such catalytic processes generally make use of reaction chambers containing a fixed body of catalyst or contact mass through which the reaction mixture is passed and in which, after the reaction has slowed down to an uneconomic point, the contact mass is regenerated in situ. Such processes are not continuous and only attain continuity by the provision of numerous reaction chambers which are alternately placed on stream and on regeneration. Likewise, it is difficult to maintain constant quantity and quality of product without numerous chambers and intricate scheduling because of the progressively decreasing activity of catalyst. This same feature, with apparatus limitations, prevents, to a degree, the use of catalyst at a uniform high efficiency level. Most of these difficulties may be avoided by the use of a method wherein the catalyst or contact mass is handled continuously as well. This invention is specifically directed to such a process.

This invention has for its object the provision of a process of hydrocarbon oil conversion wherein a continuously moving stream of hydrocarbon oil, preferably in the form of vapor heated to conversion temperature, is contacted with a continuously moving stream of catalyst for the accomplishment of conversion. Important advantages of the process contemplated herein are that the catalytic material is used only at a high level of efficiency and that it is continuously regenerated and returned to the conversion step, both operations being conducted under controlled conditions. The said high level of catalyst efficiency and constant uniformity in the character of the regenerated catalyst are obtained primarily by controlling the conditions in the regenerating zone so that the temperature of the catalyst (from which, in the case of hydrocarbon conversion, carbonaceous deposits must be oxidized or burned) is maintained within the temperature range for efficient regeneration and at the same time is not permitted to rise above the maximum combustion temperature which would cause substantial heat damage to the catalyst particles.

This temperature control in the regenerator is accomplished by effecting a positive thermal exchange between the moving catalyst mass and a heat exchange medium maintained within the moving mass or body of catalyst in indirect heat transfer relation therewith. In the regeneration of catalyst in a hydrocarbon conversion or continuous catalytic cracking operation, heat is positively extracted from within the moving mass of catalyst in the regenerating zone so that the temperature in such zone is not permitted to rise to a point where the catalyst particles would be damaged and at the same time the rate of withdrawing such heat is such that an efficient regenerating or combustion temperature is maintained. As will hereinafter appear, this positive withdrawal of heat is effected by a plurality of heat transfer tubes extending into the mass of catalyst moving through the zone or chamber in which it is regenerated. These tubes may be either parallel with or transverse to the direction of catalyst flow.

Proper apparatus in which the process contemplated herein may be carried out forms the subject matter of our companion application Serial No. 451,859, filed concurrently herewith.

This invention is based upon the principle of carrying out catalytic reactions by flowing a stream of reaction mixture in physical contact with a flowing stream of catalytic material through a reaction zone in which it is in heat exchange relationship with a heat exchange medium at a controlled temperature.

In order that this invention may be understood, reference is made to the drawings attached to and made a part of this specification. In these drawings, Figure 1 shows in diagram form a reaction and regeneration apparatus suitable for use in this process. Figures 2, 3, 4, 5, and 6 are concerned with internal details of such chambers, and Figure 7 shows in diagram form a set-up of apparatus suitable for the conversion of hydrocarbon oils.

In Figure 1, character 8 denotes a regeneration chamber; 9 a purging section; 10 a reaction chamber; 11 a second purging section; and 12 an elevator for catalyst particles. Regeneration chamber 8 and reaction chamber 10 are similar in construction and internal fittings and consist (referring now to 8) of an exterior shell 8, which may be cylindrical or rectangular in cross-section, with a convergent sealed top 13 and a convergent bottom 14 and fitted with an interior false bottom 15, which is perforate, the perforations therein being too small for the passage of catalyst particles but permitting the passage of liquid or gas. Bottom 14 is fitted with pipe 16 and top 13 with pipe 17. At the top of 13 is a sealed feeding device 18, which may be a star wheel as shown, an intermittently-operated valve set-up, or other common device of this nature. Catalyst material introduced through 18 fills the interior of shell 8, passes down therethrough, is collected by false bottom 15 and chute 19 and is removed by a second intermittently-operating device, such as star wheel 20. This arrangement effects a continuously moving stream of catalytic material through shell 8.

Reaction mixture—in this case, air for an oxidizing regeneration—may be introduced through pipe 16, and products of reaction—in this case, flue gas—may be removed through pipe 17. This effects a continuously-flowing stream of reaction material in physical contact with the continuously-flowing stream of catalytic material in shell 8. The flow shown is countercurrent. If desired, it may be made concurrent by reversing the functions of 16 and 17. Shell 8 is also internally fitted with a series of conduits 21 equipped with fins 22 joined to headers 23 and 24 through which a heat exchange medium may be passed by means of pipes 25 and 26. The heat exchange medium may be used to control the temperature of reaction by extraction of heat from or addition of heat to the material within shell 8, and its flow may be concurrent, countercurrent, or, as later shown, transverse to the direction of flow of catalytic material. Thus, in the regenerator 8 the temperature of the mass of catalyst under regeneration is closely controlled by effecting a positive exchange of heat between the catalyst and the heat transfer medium maintained within the body of catalyst and in indirect heat exchange relation therewith throughout the conduit system illustrated in Figures 1 and 2 as comprising tubes 21. Shell 10 is similarly fitted and similarly operated.

Reaction material, in this case hydrocarbons, is introduced by 27 and removed by 28; catalyst movement is controlled by 29 and 30; and heat exchange medium is circulated by pipes 31 and 32. Confined passage 9, maintained relatively full of catalyst by devices 20 and 29, is fitted with pipes 33 and 34, by means of which steam may be passed through the catalyst for purging, thereby preventing the passage of regenerating agent into the conversion chamber. Thus, section 9 provides a substantially gas-tight seal between the two chambers. A similar purging passage 11 connects with the bottom portion of shell 10 and is shown as being controlled by devices 30 and 35. The leg or passage 11 is fitted with steam connections 36 and 37 for purging the catalyst after the reaction or conversion step so as to prevent hydrocarbons other than deposited on the spent catalyst being conducted from the bottom of the conversion chamber 10 into regenerating chamber 8. From 11 the catalyst drops through 35 into boot 38 of elevator 12, by which it is elevated and discharged into bin 38a above shell 8. Elevator 12 may be of the belt and bucket type shown or of any other kind suitable for the physical properties of the catalytic materials.

It will be apparent from the foregoing that the apparatus shown in Figure 1, wherein there is a controlled gravity flow of catalyst through shells or chambers 8 and 10 into the feed boot 38 of the elevator 12, which returns the spent catalyst to the inlet of shell 10, provides means for carrying out the continuous catalytic process contemplated herein with high thermal efficiency because there is a general continuous movement of catalyst through the system substantially directly from one chamber to the other and the hot catalyst does not have an opportunity to cool to atmospheric temperature during its movement through the circuit. Obviously, arrangements other than that described above may be employed to effect the movement of catalyst substantially directly from each zone to the other without permitting it to cool to atmospheric temperature.

Customary devices for the removal of fines and the addition of makeup may be inserted in the catalyst conveyor system.

Special attention should be given to the arrangement of heat exchange tubes within the shells 8 and 10. These should be arranged so as to permit the passage of catalytic material and reaction material longitudinally through the shell in such manner that flowing material is brought into the desired heat exchange relationship with heat exchange medium. The conduits may be unfinned, but better results are obtained if the external heat transfer surface of the heat exchange tubes is augmented by the addition of fins thereto. These fins, primarily added for heat transfer reasons, may be taken advantage of to assist in control of the flow of catalyst and reaction fluid and contact therebetween by being disposed so that they, together with the tubes, divide the space within the shell into a series of longitudinal passages of substantially constant cross-section throughout their length. The arrangement of these passages should be such that the reaction material or catalyst moving through the shell comes in efficient heat exchange relationship with the heat exchange medium in the tubes. The proper dimensions for this condition depend somewhat upon the physical nature of the catalyst. A commonly-used catalyst for such purposes is a rod-shaped clay particle about 2½ mm. diameter by 4 mm. average length, and with such particles it is desirable that the passages be so arranged that no catalyst particle will be further removed from heat extractive surface than about 1 inch, and the total volume in cubic inches of the passages containing catalyst and reaction mixture should be numerically about one-eighth to twice the surface in square inches of the heat transfer surface in contact with the passages. Catalyst particles of different heat-conductivity or of different packing characteristics, or variations in the contemplated intensity of reaction per unit volume of catalyst, as well as considerations of heat transfer and pressure drop will vary the ratio somewhat. The length of the paths through which the catalyst moves during reaction and regeneration should be relatively great, say from 3 to 15 feet or more.

Figure 2 shows a cross-section of case 8 at the level 2—2 showing how the preferred longitudinal passages may be formed by equipping each heat exchange tube with two diametrically-opposed, longitudinally-disposed axial fins. Figures 3 and 4 show other ways of arriving at the same result. The heat transfer tubes need not be arranged parallel to the flow of catalyst but may well be transverse thereto, as shown in Figures 5 and 6, wherein transverse tubes 39, carrying fins 40, extend between header boxes 41 and 42 in a shell 43, to exercise the same functions as corresponding parts in shells 8 and 10; and, as aforesaid, the spacing and arrangement of the heat exchange tubes or conduits may be varied depending upon the character of the catalyst and the intensity of the reaction in the chamber or zone.

The heat exchange medium may be any fluid suitable for the load and temperature levels encountered, such as gases, liquids of various kinds, molten metals, or alloys, or fused salts. Preferably, it should be possessed of a low vapor pressure, low viscosity, and high specific heat at temperatures between 600° and 1100° F., non-corrosive to steel, and fluid at about 300–350° F. so that it may be removed from shut-down apparatus by steam heating. Convenient materials for such use are mixtures of the strong alkali salts of the oxy-acids of nitrogen.

Passages 9 and 11, used for purging by passing steam through the catalyst particles, should be so proportioned that a sufficient contact of steam and catalyst particles occurs to remove most of the residual products of the preceding reaction.

Reference is now made to Figure 7, which shows an operating set-up appropriate for a conversion of hydrocarbons, such as the vapor phase cracking of petroleum hydrocarbons to form gasoline. A charge oil or charging stock of the type conventionally used in cracking operations is fed through pipe 44 by pump 45 to a vapor preparation unit 46. Vapor preparation unit 46 will consist essentially of a heater, for which purpose any of the usual forms of heater common in the art—say, a pipe still—may be used, to heat and vaporize the charge and heat it to reaction temperature, and, if the charge used is not wholly vaporized at the reaction temperature, of a vapor separator to remove unvaporized liquid residue. Vapors from 46 move through pipe 47 into and through reaction chamber 48 (the same as 10, Figure 1), and therein they undergo catalytic reaction. Reaction products pass through pipe 49 to product purification and recovery equipment denoted by 50. The equipment 50 may be made up of any of the usual fractionation, separation, and disposal devices currently in common use for handling products of cracking reactions. If desired, product fractions boiling above the desired low-boiling product may be returned to the system for re-treatment, either separately or in admixture with fresh charge. Catalytic material flowing from 48 is purged in 51 and is elevated by 52, which introduces spent catalyst into the top of chamber 53. In chamber 53 the spent catalyst moving downwardly therethrough is regenerated by burning with air supplied by blower and pipe 54, the products of regeneration being disposed of through pipe 55. The regenerated catalyst is purged in 56 and returned to 48. The temperature level of the reaction in 48 may be controlled and latent heat of reaction added thereto by a heat exchange medium introduced through pipe 57 and removed through pipe 58. The same heat exchange medium may, in the arrangement shown in Figure 7, be used to control the temperature of regeneration in 53. As aforesaid, the heat exchange medium in the regenerating or revivification zone 53 is used to control the temperature of regeneration by positively removing heat from within the body of moving catalyst therein in a manner and at a rate such that the temperature of the catalyst does not drop below the temperature for efficient regeneration or combustion and does not rise above the temperature which would cause substantial heat damage to the catalyst material. For example, the temperature for regeneration of a spent clay catalyst for cracking hydrocarbons may range from around the cracking temperature (from about 800° F. to about 950° F.) to a peak temperature in the neighborhood of 1050° F. to 1100° F. Care should be exercised in the control of the temperature of the heat exchange medium circulated in the regenerator so that the temperature of the catalyst passing through the regenerator does not rise substantially above 1200 F., or serious damage to a catalyst of this type may result. In the arrangement shown in Figure 7 the heat exchange medium is introduced into heat exchange conduits in regenerator 53 by pipe 59 and is removed by pipe 60. It is circulated by pump 61. The temperature for the several uses may be controlled by use of various combinations of heat exchangers 62 and 63 and by-passes 64, 65, and 66 in a manner obvious to those skilled in the art.

As an example of one operation successfully conducted in such apparatus according to the process herein disclosed, coastal gas oil with which was admixed steam to the extent of about $$\frac{10 \text{ oil}}{1 \text{ water}}$$

(cold volumes) at a temperature of 800° F. was contacted with a catalyst of activated clay granules at a rate of one volume of oil (cold) to four volumes of clay in a chamber through which the clay passed at such a rate that it remained in the reaction zone about twenty minutes, with the following results:

Yield of 410° E. P. gasoline (including iso-
  butane and heavier in gas) Vol. per cent__ 67.4
Yield of dry gas (lighter than iso-
  butane)_____ Wt. per cent__ 4.0
Yield of coke_____ do____ 2.5
Yield of recycle stock____Vol. per cent__ 35.0

In this run the catalyst was passed through the regeneration chamber (of the same size as the reaction chamber) at the same rate and was burned with a sufficient volume of air to maintain above 10 per cent $CO_2$ in the exit flue gas.

The temperature of the reaction was held by use of the heat exchange medium at 800° F., and in the same manner the temperature of the regeneration was not allowed to rise above 1100° F.

The gasoline produced was of excellent quality, high in anti-knock rating, and the recycle stock was clean, light in color, and of about the same boiling point as the charge. No high-boiling, dirty, liquid cracking tar was produced. The regenerated catalyst was equal in efficiency to new catalyst, no detectable deterioration in quality being found.

It is to be understood that the specific examples and numerical data herein disclosed are set forth only as exemplary and that the invention is not to be limited thereby or thereto but is to be subject only to those limitations expressed in the following claims.

The subject matter of this application has been continuously pending before the United States Patent Office since September 4, 1937, the filing date of our application Serial No. 162,541, the continuity having been effected through the medium of our application Serial No. 361,440, filed October 16, 1940, of which this application is a continuation-in-part. Therefore, this application is a continuation-in-part of application Serial No. 162,541.

We claim:

1. A method of conducting a cyclic operation at closely-controlled elevated temperatures for the catalytic conversion of hydrocarbons, which comprises: moving active catalyst particles through a conversion zone; contacting the moving catalyst particles in said conversion zone with a moving stream of hydrocarbons under high temperature conversion conditions so as to convert the hydrocarbons and thereby cause the catalyst particles to become spent from deposited carbonaceous material; passing the spent catalyst particles from said conversion zone into a high temperature regenerating zone without permitting the catalyst particles to cool to atmospheric temperature; flowing the spent catalyst particles through said regenerating zone; contacting the spent catalyst particles in said regenerating zone with gaseous regenerating agent under regenerating conditions, thereby burning deposited carbonaceous material and generating heat of combustion; controlling the temperature of the catalyst particles so as to maintain efficient regeneration without substantial heat damage by positively extracting part of said heat of combustion with a heat transfer medium in indirect heat exchange relation with catalyst and at a lower temperature than the combustion temperature at a rate such that the temperature of the catalyst particles is not permitted to rise to a point where the catalyst will be damaged and is not permitted to drop below an efficient regeneration or combustion temperature; and returning regenerated catalyst particles from said regenerating zone to said conversion zone without permitting the catalyst to cool to atmospheric temperature.

2. A continuous cyclic method for the catalytic conversion of fluid petroleum hydrocarbons into high-quality gasoline, which comprises: moving a mass of active catalyst particles through a conversion zone; passing fluid petroleum hydrocarbons through said conversion zone under high temperature conversion conditions in contact with said moving catalyst mass whereby the said conversion is effected and the catalyst particles become spent by deposition of carbonaceous material; passing the spent catalyst particles as a moving mass from said conversion zone into and through a regenerating zone; contacting the spent catalyst particles with an oxidizing gas in said regenerating zone, thereby burning off the said carbonaceous deposit with the generation of heat; positively withdrawing heat of combustion from within the moving catalyst mass at a rate such that the temperature is not permitted to rise to a point which would cause substantial heat-damage to the catalyst particles; returning the regenerated catalyst to said conversion zone; and substantially excluding oxidizing gases from entering the conversion zone from said regenerating zone, said heat withdrawal being effected with a heat transfer medium in indirect heat exchange relation with catalyst and at a temperature lower than said combustion temperature.

3. A continuous cyclic method for the catalytic conversion of fluid petroleum hydrocarbons into high-quality gasoline, which comprises: moving a mass of active catalyst particles through a conversion zone; passing fluid petroleum hydrocarbons through said conversion zone under high temperature conversion conditions in contact with said moving catalyst mass whereby the said conversion is effected and the catalyst particles become spent by deposition of carbonaceous material; passing the spent catalyst particles as a moving mass from said conversion zone into and through a regenerating zone; contacting the spent catalyst particles with an oxidizing gas in said regenerating zone, thereby burning off the said carbonaceous deposit with the generation of heat; positively withdrawing heat of combustion from within the moving catalyst mass with a fluid heat exchange medium maintained in indirect heat transfer relation therewith so as to prevent substantial heat damage to the catalyst particles; returning the regenerated catalyst to said conversion zone; and substantially excluding oxidizing gases from entering the conversion zone.

4. A continuous cyclic method for the catalytic conversion of fluid petroleum hydrocarbons into high-quality gasoline, which comprises: moving a mass of active catalyst particles through a conversion zone; passing fluid petroleum hydrocarbons through said conversion zone under high temperature conversion conditions in contact with said moving catalyst mass whereby the said conversion is effected and the catalyst particles become spent by deposition of carbonaceous material; passing the spent catalyst particles as a moving mass from said conversion zone into and through a regenerating zone; contacting the spent catalyst particles with an oxidizing gas in said regenerating zone, thereby burning off the said carbonaceous deposit with the generation of heat; positively withdrawing heat of combustion from within the moving catalyst mass with a temperature-controlled fluid heat exchange medium maintained in indirect heat transfer relation therewith so as to prevent substantial heat damage to the catalyst particles; returning the regenerated catalyst to said conversion zone; and substantially excluding oxidizing gases from entering the conversion zone.

5. A continuous cyclic method for the catalytic conversion of fluid petroleum hydrocarbons into high-quality gasoline, which comprises: moving a mass of active catalyst particles through a conversion zone; passing fluid petroleum hydrocarbons through said conversion zone under high temperature conversion conditions in contact with said moving catalyst mass whereby the said conversion is effected and the catalyst particles become spent by deposition of carbonaceous material; passing the spent catalyst particles as a moving mass from said conversion zone into and through a regenerating zone; contacting the spent catalyst particles with an oxidizing gas in said regenerating zone, thereby burning off the said carbonaceous deposit with the generation of heat; controlling the temperature of regeneration to prevent substantial heat damage to the catalyst by circulating a fluid heat exchange medium into indirect heat exchange relation with the moving catalyst mass and maintaining the temperature of said heat exchange medium between a minimum temperature for efficient regeneration and a maximum temperature which would cause substantial heat damage to the catalyst; returning the regenerated catalyst to said conversion zone; and substantially excluding oxidizing gases from entering the conversion zone.

6. A continuous cyclic method for the catalytic conversion of fluid petroleum hydrocarbons into high-quality gasoline, which comprises: moving a mass of active catalyst particles through a conversion zone; passing fluid petroleum hydrocarbons through said conversion zone under high temperature conversion conditions in contact with said moving catalyst mass whereby the said conversion is effected and the catalyst particles become spent by deposition of carbonaceous material; passing the spent catalyst particles as a moving mass from said conversion zone into and through a regenerating zone; contacting the spent catalyst particles with an oxidizing gas in said regenerating zone, thereby burning off the said carbonaceous deposit with the generation of heat; positively withdrawing heat of combustion from within the moving catalyst mass with an indirectly contacted heat transfer medium at a rate such that the temperature of the catalyst particles is not permitted to rise to a point where they would be damaged by heat and is not permitted to drop below an efficient regenerating temperature; and returning the regenerated catalyst to said conversion zone.

7. A method of conducting a cyclic operation at closely-controlled elevated temperatures comprising a catalytic hydrocarbon conversion wherein moving solid adsorbent catalyst particles are intimately contacted with a moving stream of substantially only vapors of a hydrocarbon material and a regeneration reaction wherein the spent catalyst from said catalytic reaction is regenerated by intimately contacting the particles with a gaseous regenerating agent while both are moving, which comprises: flowing the active catalyst particles through a conversion zone in intimate contact with a stream of said hydrocarbon vapors flowing countercurrent thereto under conversion conditions so as to effect said conversion; withdrawing spent particles from said conversion zone; passing said spent particles into a regenerating zone without permitting them to cool to atmospheric temperature; flowing said spent particles through said regenerating zone in intimate contact with a stream of said gaseous regenerating agent flowing countercurrent thereto so as to regenerate the particles; circulating a liquid heat exchange medium within sufficiently close indirect heat exchange with every catalyst particle in said regenerating zone that the temperature of all particles while in said regenerating zone may be maintained within a suitable regenerating temperature range while preventing any deleterious temperature occurring; returning regenerated catalyst particles from said regenerating zone to said conversion zone without permitting them to cool to atmospheric temperature; and preventing said hydrocarbon vapors from passing into said regenerating zone at all times and preventing said regenerating agent from passing into said conversion zone at all times.

8. A method of conducting a cyclic operation at closely-controlled elevated temperatures comprising a catalytic hydrocarbon cracking reaction wherein moving solid catalyst particles are intimately contacted with a moving stream of substantially only vapors of a petroleum oil to be cracked and a regeneration reaction wherein the spent catalyst from said cracking reaction is regenerated by intimately contacting the spent particles with a gaseous regenerating agent while both are moving, which comprises: flowing the active catalytic particles through a cracking zone in intimate contact with a stream of said petroleum vapors under cracking conditions so as to effect said cracking, withdrawing spent particles from said cracking zone, passing said spent particles into a regenerating zone without permitting them to cool to atmospheric temperature; gravitating said spent particles through said regenerating zone in intimate contact with a stream of said gaseous regenerating agent which rises throughout said regenerating zone so as to regenerate the particles; circulating a molten salt heat exchange medium, maintained at a temperature between the minimum regenerating temperature and the maximum regenerating temperature that does not substantially heat-damage said particles, within close indirect heat exchange with every particle in said regenerating zone so that heat transfer surface controlled thereby is within about one inch of all particles in said regenerating zone, whereby their temperature is maintained within a suitable regenerating temperature range while preventing any deleterious temperature occurring; returning regenerated particles from said regenerating zone to said cracking zone without permitting them to cool to atmospheric temperature; and preventing said petroleum vapors from passing into said regenerating zone at all times and preventing any substantial amount of combustion-supporting gas from passing into said cracking zone at all times.

9. A method of conducting a cyclic operation at closely-controlled elevated temperatures for the conversion of hydrocarbons wherein moving solid catalyst particles are intimately contacted with a moving stream of hydrocarbons to be converted and wherein the spent catalyst from said conversion reaction is regenerated by intimately contacting the spent particles with a gaseous regenerating agent while both are moving, which comprises: flowing the active catalyst particles through a conversion zone in intimate contact with a moving stream of hydrocarbon vapors under conversion conditions so as to convert the hydrocarbons and thereby cause catalyst particles to become spent from deposited carbonaceous material; purging said spent particles with an inert gaseous medium to remove some of the carbonaceous material associated therewith; passing said purged spent particles into a regenerating zone without permitting them to cool to atmospheric temperature; flowing said spent particles through said regenerating zone; intimately contacting said spent particles in said regenerating zone with a gaseous regenerating agent under regenerating conditions so as to regenerate said particles; controlling the temperature of the catalyst particles during the period of catalyst regeneration so as to maintain efficient regeneration without substantial heat-damage to the particles by effecting a positive heat exchange between the catalyst and a heat exchange medium circulated within the moving catalyst mass in indirect heat transfer relation therewith; returning regenerated particles from said regenerating zone to said conversion zone without permitting them to cool to atmospheric temperature; and at all times preventing any substantial passage of hydrocarbon reactant vapors and regenerating agent into said regenerating zone and said conversion zone, respectively.

10. A method of conducting a cyclic operation at closely-controlled elevated temperatures comprising a catalytic petroleum conversion reaction wherein moving solid catalyst particles are intimately contacted with a moving stream of petroleum oil to be converted and a regeneration reaction wherein the spent catalyst from said conversion reaction is regenerated by intimately contacting the spent particles with a gaseous regenerating agent while both are moving, which comprises: flowing the active catalyst particles through a conversion zone in intimate contact with a moving stream of said petroleum oil under conversion conditions so as to convert the oil and thereby cause catalyst particles to become spent from deposited carbonaceous material; purging said spent particles with an inert gaseous medium to remove some of the carbonaceous material associated therewith; passing said purged spent particles into a regenerating zone without permitting them to cool to atmospheric temperature; flowing said spent particles through said regenerating zone in intimate contact with a moving stream of said gaseous regenerating agent under regenerating conditions so as to regenerate the particles; controlling the temperature of all particles in said regenerating zone by circulating a fluid heat exchange medium in said regenerating zone in indirect heat exchange relation with the particles therein so as to maintain their temperature at an efficient regenerating temperature that will not cause substantial heat-damage to the catalyst particles; returning regenerated particles from said regenerating zone to said conversion zone without permitting them to cool to atmospheric temperature; and preventing any substantial amount of said petroleum oil reactant from passing into said regenerating zone at all times and preventing any substantial amount of combustion-supporting gas from passing into said conversion zone at all times.

11. The method of converting a petroleum hydrocarbon oil into high-quality gasoline by a process comprising catalytic cracking, which method comprises: heating the oil to form vapors at conversion temperature; introducing the heated vapors into a substantially-compact, moving mass of catalyst in a conversion zone, whereby said vapors are converted and carbonaceous material is deposited on said catalyst; introducing catalyst into said conversion zone and removing catalyst from said conversion zone without appreciable losses of hydrocarbon vapors with said catalyst; continuously regenerating said removed catalyst by moving it as a substantially compact mass through a regenerating zone; passing combustion-supporting gas through the catalyst in the regenerating zone to burn off the carbonaceous deposit with the generation of heat; positively withdrawing part of the heat of combustion from within the moving mass of catalyst with an indirectly contacted heat transfer medium at such a rate as to prevent the establishment of temperature conditions which would cause substantial heat damage to the catalyst particles and at the same time the said rate of heat withdrawal being such that an efficient regeneration temperature is maintained within the moving mass of catalyst; substantially directly returning the high temperature regenerated catalyst to said conversion zone; preventing any substantial amount of combustion-supporting regeneration gases from entering the conversion zone from said regenerating zone; and fractionating the products from the conversion step.

12. The method of claim 11 which includes the further step of purging the hot spent catalyst with a hot inert gas prior to its admission to the regenerating zone so as to remove adsorbed oil therefrom.

13. The process of claim 8 wherein the regenerated catalyst particles are purged with an inert gaseous medium in order to remove regeneration zone gases therefrom before passing said catalyst particles to said conversion zone.

14. A method of conducting a cyclic operation at closely-controlled elevated temperatures comprising a catalytic conversion of fluid petroleum hydrocarbons to high-quality gasoline wherein moving solid catalyst particles are intimately contacted with the vapors of said petroleum hydrocarbons and a regeneration reaction wherein spent catalyst particles from said catalytic conversion are regenerated by intimately contacting the particles with a combustion-supporting gas while both are moving, which comprises: flowing the active catalyst particles through a conversion zone in intimate contact with said petroleum hydrocarbon vapors under conversion conditions so as to effect said conversion; continuously withdrawing spent particles from said conversion zone; passing said spent particles substantially directly to a regenerating zone; flowing said spent catalysts as a substantially solid column of particles through said regenerating zone in intimate contact with said combustion-supporting gas flowing countercurrently therethrough so as to regenerate the particles by burning off carbonaceous impurities; circulating a fluid heat exchange medium within sufficiently close indirect heat exchange with every catalyst particle in said regenerating zone that the temperature of all particles in said regenerating zone may be maintained between the minimum combustion temperature and the maximum combustion temperature that does not substantially heat-damage said particles; continuously withdrawing regenerated catalyst particles from said regenerating zone; returning said regenerated catalyst particles substantially directly to said conversion zone; and preventing said petroleum vapors from passing into said regenerating zone at all times and preventing said combustion-supporting gas from passing into said conversion zone at all times.

15. A continuous cyclic method for the catalytic conversion of hydrocarbons which comprises: moving active catalyst particles through a conversion zone while contacting same in said conversion zone with a moving stream of hydrocarbons under high temperature conversion conditions whereby the said conversion is effected and the catalyst particles become spent by deposition of carbonaceous material; passing the spent catalyst particles from said conversion zone into a high temperature regenerating zone; moving the spent catalyst particles through said regenerating zone while contacting same with gaseous regenerating agent under regenerating conditions, thereby burning deposited carbonaceous material and generating heat of combustion; controlling the temperature of the catalyst particles so as to maintain efficient regeneration without substantial heat damage by positively extracting part of said heat of combustion, with a heat transfer medium in indirect heat exchange relation with catalyst and at a lower temperature than the combustion temperature, at a rate such that the temperature of the catalyst particles is not permitted to rise to a point where the catalyst will be damaged and is not permitted to drop below an efficient regenerating or combustion temperature; and returning regenerated catalyst particles from said regenerating zone to said conversion zone.

16. A continuous cyclic method for the catalytic conversion of fluid petroleum hydrocarbons into high-quality gasoline, which comprises: moving a mass of active catalyst particles through a conversion zone; passing fluid petroleum hydrocarbons through said conversion zone under high temperature conversion conditions in contact with said moving catalyst mass whereby the said conversion is effected and the catalyst particles become spent by deposition of carbonaceous material; passing the spent catalyst particles as a moving mass from said conversion zone into and through a regenerating zone; contacting the spent catalyst particles with an oxidizing gas in said regenerating zone, thereby burning off the said carbonaceous deposit with generation of heat; positively withdrawing heat of combustion from within the moving catalyst mass at a rate such that the temperature is not permitted to rise to a point which would cause substantial heat damage to catalyst particles and returning regenerated catalyst to said conversion zone, said heat withdrawal being effected with a heat transfer medium in indirect heat exchange relation with catalyst particles.

THOMAS P. SIMPSON.
JOHN W. PAYNE.
JOHN A. CROWLEY, Jr.